June 25, 1935.   H. ERNST ET AL   2,005,731
VISCOSITY COMPENSATING SYSTEM
Filed June 16, 1930   6 Sheets-Sheet 1

Inventors
Hans Ernst
Charles W. McK. Goodrich
By Attorneys
Nathan & Bowman

Inventors
Hans Ernst
Charles W. McK. Goodrich
By Attorneys
Nathan & Bowman

June 25, 1935.   H. ERNST ET AL   2,005,731
VISCOSITY COMPENSATING SYSTEM
Filed June 16, 1930   6 Sheets-Sheet 5

Inventors
Hans Ernst
Charles W. McK. Goodrich
By  Attorneys
Nathan & Bowman

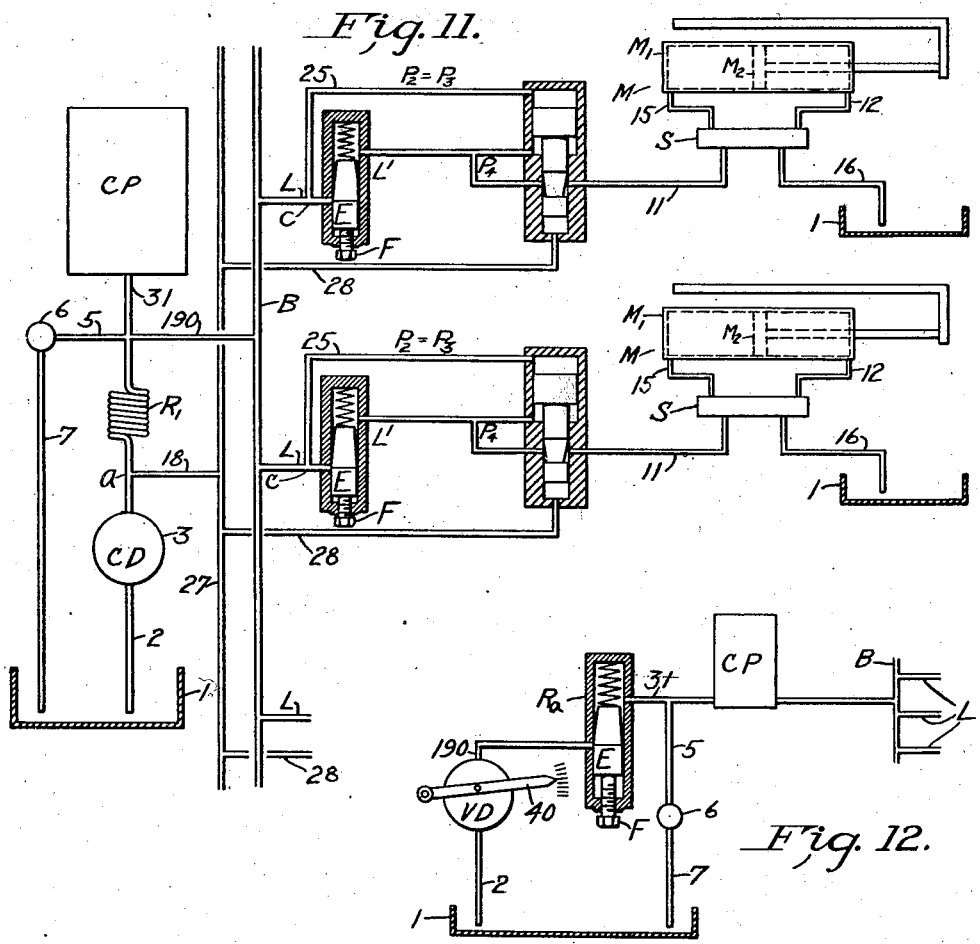

Patented June 25, 1935

2,005,731

UNITED STATES PATENT OFFICE 2,005,731

VISCOSITY COMPENSATING SYSTEM

Hans Ernst and Charles W. McK. Goodrich, Cincinnati, Ohio, assignors to The Cincinnati Milling Machine Company, Cincinnati, Ohio, a corporation of Ohio Application June 16, 1930, Serial No. 461,569

15 Claims. (Cl. 60—52)

This invention deals with the proposition of rendering any throttle-controlled hydraulic system immune to irregularities in action in consequence of variations in the viscosity or temperatures of the medium employed which, ordinarily, is oil.

Figure 3:
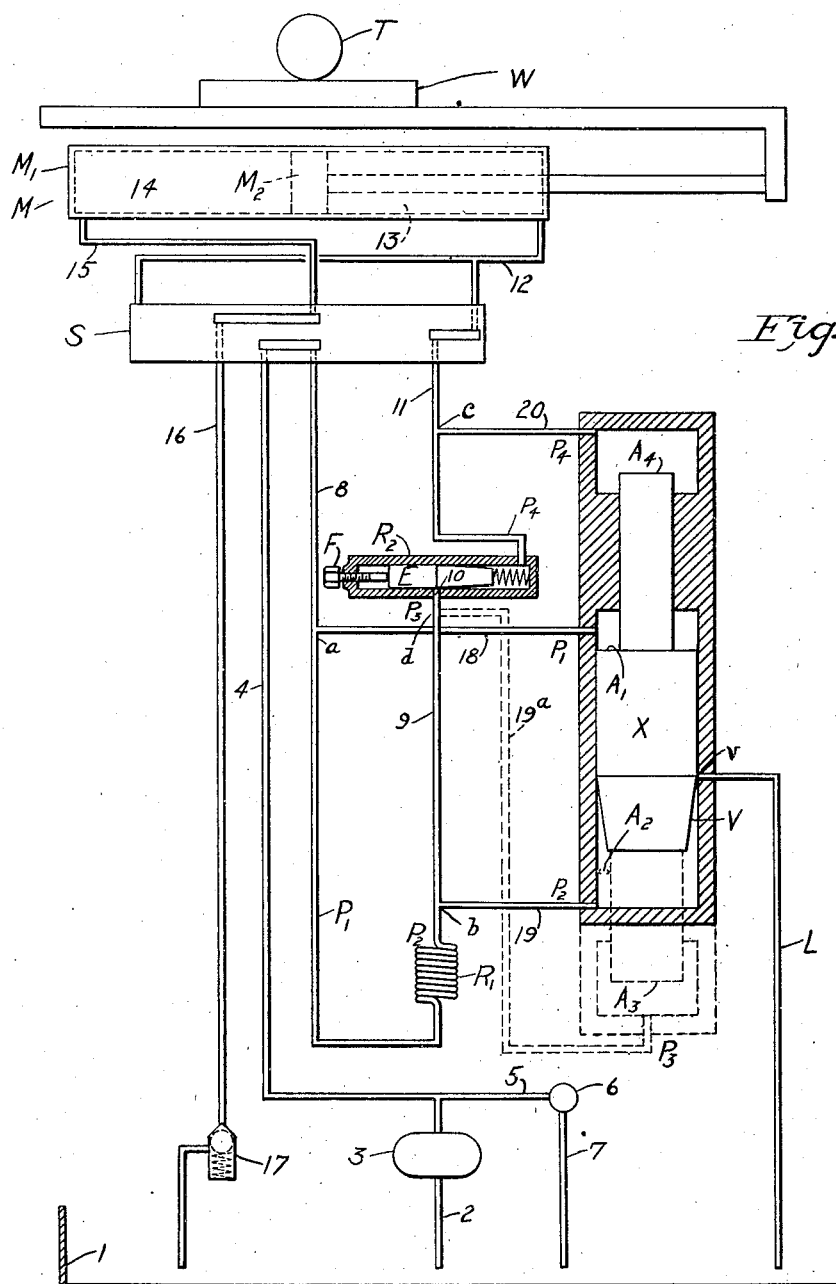
Figure 1:
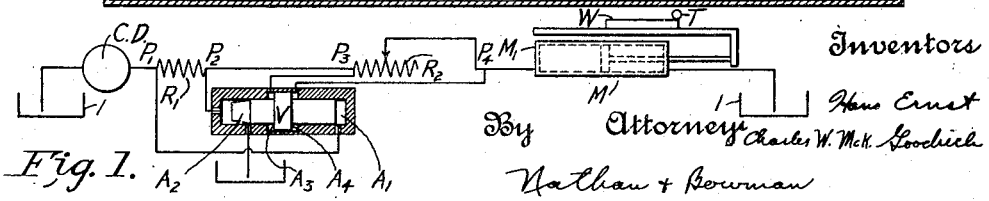
Figure 2:
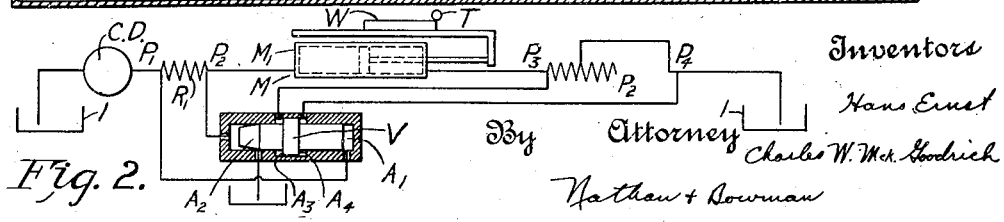
Figures 9, 10:
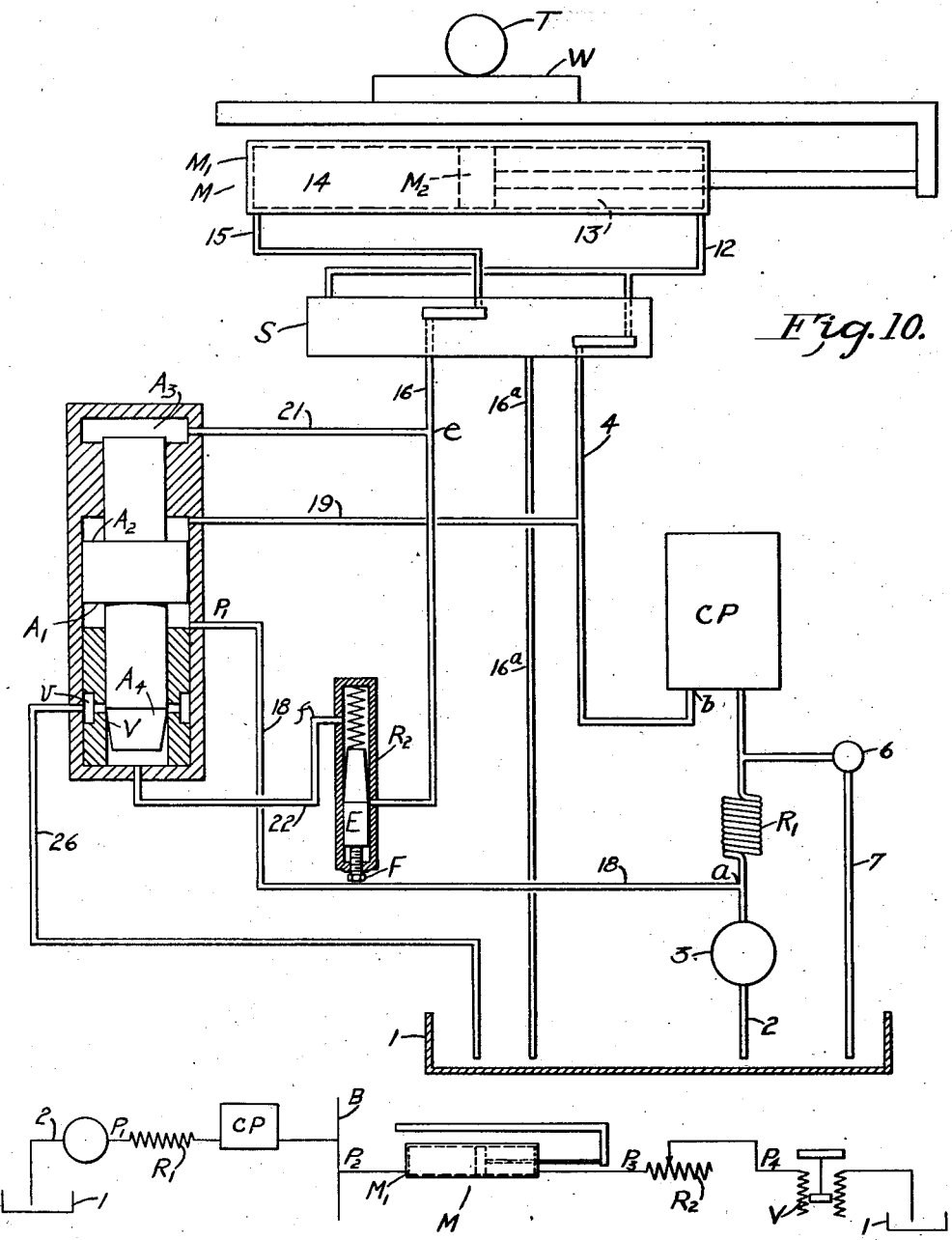

In the accompanying drawings, Figure 1 is a linear diagram and Fig. 3 a lay-out of a system having a directly regulated drainage from a volumetrically constant flow and in which the feed rate is determined by throttling the forward pressure line. Fig. 2 is a linear diagram and Fig. 4 a lay-out of a system similar except that the back-pressure line is throttled. Fig. 5 is a linear diagram and Fig. 6 a lay-out of a system deriving its flow from an accumulator and in which the compensator, throttle and motor are in series in the order mentioned. Fig. 7 is a linear diagram and Fig. 8 a lay-out of a system similar except that the order is throttle, compensator and motor. Fig. 9 is a linear diagram and Fig. 10 a lay-out of a system similar except that the serial order is motor, throttle and compensator. Fig. 11 is a diagrammatic lay-out like Figs. 7 and 8 of a system for operating a plurality of motors at independent feed rates. Figs. 12, 13 and 14 are diagrams showing how the viscosity measuring resistance is set to correspond with any given or selected constant flow; in Fig. 12 both being manually adjustable, in Fig. 13 the flow being manually adjustable and the resistance automatically, and in Fig. 14 both being automatically adjustable to ensure a constant pressure at the source.

According to their intended purpose, hydraulic systems have been contrived to supply the medium in various ways, as for instance, under a constant pressure, or at a uniform rate of flow. The ultimate rates are usually attained either by automatically throttling the direct flow when the medium is derived from a constant pressure source (as an accumulator) or by automatically throttling an escapement for the excess when the fluid is derived from a continuously running pump which constantly forces an oversupply of fluid into the system. In the former case, all the fluid goes to the hydraulically-actuated mechanism, while in the latter more or less of the total output of the pump is utilized.

In machine-tools, the maintenance of an uniform rate of "feed" is, with but few exreptions, of paramount importance; especially in a milling-machine.

Heretofore, it has been theoretically assumed, in contriving various systems, that the physical characteristics of the fluid are substantially definite and invariable. But in actual practise they are not, for different oils have different viscosities, and for any given oil, the viscosity varies with its temperature. The temperature, furthermore, varies with work performed by the machine, etc. The viscosity is by no means a negligible factor for it very materially affects the rate of feed if determined by a throttle. This is due to the fact that, under a given pressure, a given orifice will pass more limpid than thick oil. Thus, neglecting the effect of a by-pass escapement, the feed will increase inversely with the viscosity, and as the viscosity increases the feed will decrease. The hotter the oil, the greater will be the feed permitted by a given discharge-orifice, and conversely.

Now, changes in viscosity cannot be anticipated by any initial manual adjustment of a hand-throttle. Furthermore, it is important that, when the user wishes to set the throttle to yield any selected feed, its corresponding position should be accurately indicated by a definite dial or scale-reading. We have, with this in view, conceived that any adjustment in the nature of compensation for viscosity should be auxiliary and preferably automatic, so as to require no attention by the user, and we have contrived means for accomplishing adequate compensation for all variations in viscosity, as will now be explained.

Inasmuch as the details of the system will necessarily depend more or less upon the nature of the source of the oil, it will be conducive to clearness first to explain how viscosity can be compensated for in case a constant delivery pump is employed. In any such conventional system, the pump is proportioned to deliver more oil than is needed for propelling the motor at its various feed rates; the excess being ordinarily diverted through a relief valve or by-pass. In addition to this constantly functioning relief, there is usually also provided a safety-valve which has no functional purpose except under some abnormal contingency. The regulation of the feed-rate is, in such a system, determined by the setting of a hand-throttle and its location also determines whether the system is an "open" one (conventionally with no material back-pressure on the motor) or whether it is a "closed" one with a consequential back-pressure on the motor.

In an "open" system, the feed-throttle is in the forward-pressure line. An auxiliary drain from the input pipe ahead of the throttle will, where the oil comes from a constant-displacement pump, diminish the amount of oil admitted to the motor, and cause it to be propelled more slowly than if it received the full output of the pump; the indirect effect being simultaneously to expel less from the exhaust side of the motor.

Therefore, in an "open" system, in undertaking to compensate for heating-up (decreasing viscosity) the ultimate effect must be equivalent to increasing the resistance and thereby maintaining constant the amount of an auxiliary drainage of the input oil. While an increase in fluidity increases the flow through the throttle and tends to force more oil to enter the motor, the amount by-passed through an auxiliary drain which, as stated, will needs be located before the throttle, will be increased to a greater extent because the throttle is in series with the motor-resistance which is unaffected by fluidity whereas the drain is not.

In an "open" system, it is impossible to compensate for viscosity alone from an auxiliary drain solely in the discharge line from the motor for the reason that then the total output of the constant delivery pump would in any event go to the motor.

In a "closed" system, the feed-throttle is located in the out-let line, but the auxiliary drain must (as in an "open" system) be located in the input line; in which case, for a given condition of flow, any decrease in the resistance to flow through the auxiliary drain will effect a reduction in the forward-pressure, the back-pressure will proportionally drop, less oil will pass the throttle in the back-pressure line, and the feed will decrease.

So this invention prescribes, where a constant displacement pump is used, for any given increase in viscosity, proportionally to oppose auxiliary drainage of input oil in either an "open" system, or a "closed" system. In both systems, as the hand throttle is undergoing closure, the feed-rate is reducing since the input is being reduced in the "open" case and the out-let is being decreased in the "closed" case. So, to compensate for a decrease in viscosity, it is prescribed to provide for an auxiliary drainage, neither for maintaining a constant pressure at nor a constant differential pressure across the hand-throttle, but for so relieving the pressure at the hand-throttle as the viscosity decreases as to ensure that the main flow through the manually adjustable throttle will be at a volumetrically-constant rate irrespective of viscosity variations.

But here let it be said that this invention embodies a means for measuring or determining the viscosity at all times, and that this means automatically cooperates towards producing a secondary adjustment which in turn compensates for all such variations in viscosity as occur. This means owes its origin to the fact that, when a stream encounters any resistance, as by being forced through a restricted passage, it undergoes a drop in pressure. Its potential is higher, during its flow, ahead of any resistance, and lower after leaving such resistance. Now it so happens that, for any given flow, the difference between such pressures is also a definite function of the viscosity; the greater the viscosity, the greater will be the potential differential, and conversely. In fact, the differential is directly proportional to the viscosity so that, if the viscosity should become one-half, then will the differential likewise be halved.

Remembering that a constant-displacement pump furnishes the oil to the system under immediate consideration, and hence a constant volume flows through the pipe, it will be seen that, by locating a definite resistance (a choke coil or restricted aperture) in that pipe so that the entire output of the pump is caused to pass through it before being divided, the pressure differential will be a true index of the viscosity, regardless of all other considerations. This may be termed the viscosity differential and this invention proposes, as a fundamental proposition, to utilize it to compensate for all such variations in viscosity as would otherwise render irregular the effect of the means resorted to for regulating the feed-rate. In the example under immediate consideration, it is proposed that this be done by maintaining a volumetrically-constant rate of drainage for any given feed-rate for, as the system received its total supply at a volumetrically-constant rate from the constant delivery pump, the proportion sent to the motor will be volumetrically constant if the proportion drained is also constant. And it is proposed to utilize this variable differential (of a constant flow past a fixed resistance) as one of the factors in regulating the resistance of an auxiliary drain (located in subsequent order in the line) so as to maintain a close conformity between the true feed-rate and the indicated feed-rate (determined by the setting or scale reading of the manually-adjustable throttle) regardless of variations in viscosity.

This clears the way for contriving a device for maintaining an uniform volumetric flow through the throttle so far as viscosity variations alone are concerned. But, when the user sets the hand-throttle at any indicated feed-rate, the machine must operate at that rate not only despite variations in viscosity but furthermore regardless of the opposition produced by the cutter in performing its tooling-operation; whether taking light or heavy cuts. In other words, although the motor is subjected to a variable mechanical force acting with or against it, as the case may be, it is nevertheless desirable that its set rate of movement shall not be influenced by any variations in that force.

If the oil is to move the motor uniformly at a selected rate, it must be admitted and discharged at a volumetrically uniform rate, and as it has to perform work in proportion to the amount of resistance offered by the motor, its pressure must be commensurate with the effort necessitated. In other words, to increase as the mechanical opposition increases, and conversely, but only to the extent required to cause a volumetrically uniform flow. If the drop in pressure across a resistance (such as a selective resistance throttle) be kept at a constant value, then will the flow be constant irrespective of the work to be done if, at the same time, no variation in viscosity occurs. Hence, any means which will hold the throttle differential constant will ensure a constant flow and, to keep the differential constant, the pressure ahead of the throttle must increase as much as the pressure behind it increases. This can be done through the agency of a spring-governed auxiliary drain instrumentality in the manner disclosed in the copending application of Nenninger and Ernst, Filed November 17, 1927, Serial No. 233,972 and entitled Uniform feed system, but without compensating at the same time for variations in viscosity which require a corresponding variation of the differential. So what we need to do is to keep the throttle differential constant irrespective of variations in mechanical load if there be no variations in viscosity (which a spring can do) and to readjust the value of that constant to make it compatible in point of uniform flow with any and every different condition of viscosity. To attempt to do the latter by a spring, it would be necessary to contrive one whose characteristic would vary in conformity with the variations in viscosity which, in general may be taken as a function of the temperature.

To make a thermostatic spring, capable of answering that requirement in a practical way, would be troublesome, so this invention proposes to make the hydraulic differential itself perform the office of such a spring. In other words, so to regulate an auxiliary drain that load fluctuations will be met by simultaneous variations in pressure in equal increments on each side of the rheostat or throttle. Thereby the throttle differential will keep itself constant with like effect on the feed-rate irrespective of load changes.

To accomplish complete compensation (for duty as well as viscosity) in a system of either the "open" or "closed" type, this invention prescribes that the viscosity-differential, as it may be termed, shall operate in opposition to the throttle-differential towards mutually regulating the resistance to flow through the auxiliary drainage.

How these two differentials may thus be coordinated, will now be explained through reference to diagrams Figs. 1 and 2. Let there be two rheostats arranged in series in the conduit system; the one $R_1$ is fixed in value, and the other $R_2$ is manually adjustable but set at any desired definite value. $P_1$ and $P_2$ are the pressures ahead and behind the first, and $P_3$ and $P_4$ are the pressures ahead and behind the second. Then:

$P_1-P_2$ is the viscosity differential which varies as the viscosity changes irrespective of variations in duty.

$P_3-P_4$ is the throttle differential which must be maintained in definite ratio to the viscosity differential irrespective of variations in duty.

In order to maintain such a definite ratio, we may resort to a valve device V sensitive to the pressures $P_1$, $P_2$, $P_3$ and $P_4$ and so arranged as to be in equilibrium only when the effect of the differential $P_1-P_2$ is equal to and balanced by the effect of the differential $P_3-P_4$.

The effect of these pressures on any valve device must be interpreted in terms of the areas to which they are applied, i. e. as forces. Denoting such areas as $A_1$, $A_2$, $A_3$ and $A_4$, we have, as a general equation:—

$$P_1A_1-P_2A_2=P_3A_3-P_4A_4$$

In order to make the effect of any differential constant, regardless of the actual values of the pressures producing this differential, the areas acted upon by the two factors of the differential must be equal, otherwise the effect of the differential will be distorted. Consequently where we are dealing only with the maintenance of the aforesaid definite ratio, regardless of changes in the actual values of the pressures, this equation may be simplified by considering $A_3$ equal to $A_4$, and $A_1$ equal to $A_2$. But it may here be mentioned that this applies only where variations in viscosity alone are sought to be compensated for. With certain other objectives additionally in view, as for example correction for leakage, the ratios $A_1:A_2$ and/or $A_3:A_4$ may effectively be other than unity.

If $A_1=A_2$ and $A_3=A_4$, then the equation becomes $$A_1(P_1-P_2)=A_3(P_3-P_4)$$

and thus $$\frac{A_2}{A_4}=\frac{A_1}{A_3}=\frac{P_3-P_4}{P_1-P_2}$$

The motor and hand throttle may be arranged in series in the order shown by Fig. 1 or else in the order shown by Fig. 2. In the former case, if the work resistance increases, the motor tends to slow down, the immediate forward pressure $P_4$ tends to rise on account of the continuing flow through $R_2$ thus tending to reduce the throttle differential $P_3-P_4$. This reduction so unbalances the valve V as to increase the effect of the viscosity differential $P_1-P_2$ which in turn tends to close the valve and increase the resistance to drainage. Thereupon the pressures $P_2$, $P_3$ and $P_1$, must all rise by an equal increment until the throttle differential is restored to its original value; thus compelling the same rate of flow through the throttle, as before, and maintaining the same rate of motor movement as existed before the work resistance increased. All this is in consequence of the fact that, notwithstanding a rise in pressure at the point of drainage, the valve has taken a new position such as to produce a resistance of an amount sufficient to prevent an increase in the rate of drainage.

The temperature of the machine rises when put to work, and the oil will become more limpid through a decrease in viscosity. Bearing in mind that, in this diagram, the constant-delivery pump CD maintains its output irrespective of the condition of the oil, the flow through the fixed resistance will continue constant, while the viscosity differential will drop. This tends to unbalance the valve in such a way as momentarily to reduce the resistance of drainage and thereby reduce the pressures $P_1$, $P_2$ and $P_3$ until the effect of the throttle differential becomes equal to the effect of the viscosity differential produced by the change in the oil. If the valve be proportional so that $A_1=A_3$ and $A_2=A_4$, the opposing differentials will themselves become equal. Consequently in neither case will there be any change in the amount of drainage and in the amount passed by the throttle.

In the arrangement diagrammed by Fig. 2, where the motor is ahead of the throttle, an increase in work resistance will momentarily tend to slow down the motor; thereby reducing pressure $P_3$ and increasing pressure $P_2$ and, by an equal increment, increasing pressure $P_1$. The new values $P_1$ and $P_2$ will be balanced and without any new effect on valve V. Pressure $P_3$ being reduced will enable valve V to shift in the direction of closure and increase the resistance to drainage. As in the preceding example of Fig. 1, this increases the pressure on the motor sufficiently to handle its increased load without change of rate.

Should viscosity change, the arrangement of Fig. 2 will compensate as previously explained in connection with Fig. 1.

To obtain, in available form, the differential of some such higher and lower pressures, it is only necessary to apply those pressures to appropriate physical areas so connected or arranged as to exert opposing forces on a valve actuating member. For example, in Fig. 4, a plunger or piston X is slidable in a cylinder which is divided into four chambers; the plunger being formed to present four hydraulically distinct areas. Of these, area $A_1$ and $A_2$ are in opposition, and likewise $A_3$ and $A_4$. A conduit 18 leads from point a to one chamber and subjects the area $A_1$ to a hydraulic pressure which will be denoted by $P_1$. The piston X is thereby given a force-urge equal to $P_1$ times $A_1$ or $P_1A_1$. Likewise, a conduit 19 leads from point b (at the far end of the resistance $R_1$) to the other chamber and subjects the area $A_2$ to a lower pressure denoted by $P_2$. Thereby the piston X is given an opposing force-urge equal to $P_2A_2$. The piston is thus subjected to a resultant force which is directly proportional to the viscosity differential and its direction will be determined by the algebraic difference (and hence the direction of $P_1$ which is the greater) of these two products which, in turn, is independent of the actual size of the equal areas $A_1$ and $A_2$. In like manner, the throttle differential may be reduced to a balancing force-urge on the same piston. This piston represents any mechanism, regardless of its physical embodiment, available for operating a regulatable resistance which is here indicated as a valve V which refers to a port and a closure element therefor. For the sake of mechanical simplicity, but of course not necessarily, these features will preferably be combined in unitary form, as shown, and, in certain cases, as in Fig. 3, the four areas may actually be reduced to three by merging area $A_2$ with $A_3$ in which the merger is shown in full lines and the dotted show the areas separated.

By referring to Fig. 3, how this invention may be embodied in practice may now be learned. Through the conduit 4, the fluid is derived from a constant-volume source which is here represented by a constant-displacement pump 3 drawing oil through the lead 2 from a reservoir or supply 1. As a safety measure, in case of some blockage, there should be provided a relief safety-valve 6 connected by line 5 with the delivery end of the pump and having a discharge 7 to the reservoir. It should be noted that this safety-valve, as located in Fig. 3, permits no escape except under some abnormal contingency and exercises no office in securing compensation.

More or less of the thus-derived oil is ultimately put to work in actuating a motor which in turn is utilized as a prime-mover for whatever mechanism it is desired to be power-driven. A milling machine, by reason of its variety of movements and its need of close control well exemplifies the utility of this invention and, accordingly, will be taken as a typical embodiment. Thus, T denotes the cutter which, in a milling machine, is usually arranged to be rotated either clockwise or conversely to "mill" a work-piece W mounted on a suitable table which is propelled in various conventional cycles automatically under valve and trip control. To detail this mechanism would consume needless space but, for those not familiar with the art, reference may be made to the British Patent No. 297,104.

The motor M, as a matter of mechanical simplicity will preferably be of the reciprocating piston type and is diagrammed by the cylinder $M_1$ and piston $M_2$ connected by the usual piston-rod with the table which carries the work. A pipe 12 admits or exhausts the fluid from chamber 13, and another pipe 15 admits or exhausts from chamber 14, according to the direction of flow which is, in turn, determined by a direction and rate controller in the nature of a valve organization indicated diagrammatically by S; usually dog and manually operable. As the particular construction of this valve is not of the essence of this invention, and as a suitable form is detailed in the aforesaid British patent, it need not be herein further described.

The output of the pump 3 is admitted to the controller S by the conduit 4, and when a rapid-traverse is desired, passes directly to the motor; the discharge being through a return 16 to the reservoir 1 after preferably passing a relief-valve 17 (usually of a low-pressure setting) which serves to keep the system full of oil.

During tooling periods, a "feed" rate is required and close regulation needed and the controller S is set to connect conduit 4 with conduit 8 which is in operative relation with the viscosity compensator. Through pipe 11, the flow regulated to maintain an uniform feed rate is admitted to the controller S and through it to the motor; the discharge occurring, as before, through the return line 16.

The viscosity determiner comprises a fixed or set resistance $R_1$ located in this instance in the line 8 which carries the full output of the pump. This resistance is an arbitrary constant adopted for a given constant flow. If a series of identical machines is to be manufactured, using constant-displacement pumps all of equal output, this resistance will not need any initial adjustment for individual machines, and hence may and preferably will be in the form of a choke coil. But, if the quantity of oil used by the machine will, in one shop be more or less than in another factory, then it is desirable to use a throttle capable of being adjusted initially with regard to the particular constant of flow and adapted to be locked to prevent being tampered with. This will be explained more fully in connection with Figs. 12, 13 and 14. While, as has been stated, this set resistance is so located as to receive the full output of the pump, it is not to be inferred that it may not otherwise be arranged so long as it is caused to pass a volumetrically constant flow of oil substantially identical in character and temperature with the oil passing the hand-throttle; in short, corresponding in viscosity with that used in the system.

At point b, the oil from the source divides into paths; the one 9 conducting the fraction used by the motor and the other 19 conducting the residual fraction which goes to drainage under the regulation of the compensator which maintains its flow at a volumetrically constant rate regardless of viscosity, the rate, however, being determined by the throttle setting.

Figure 4:
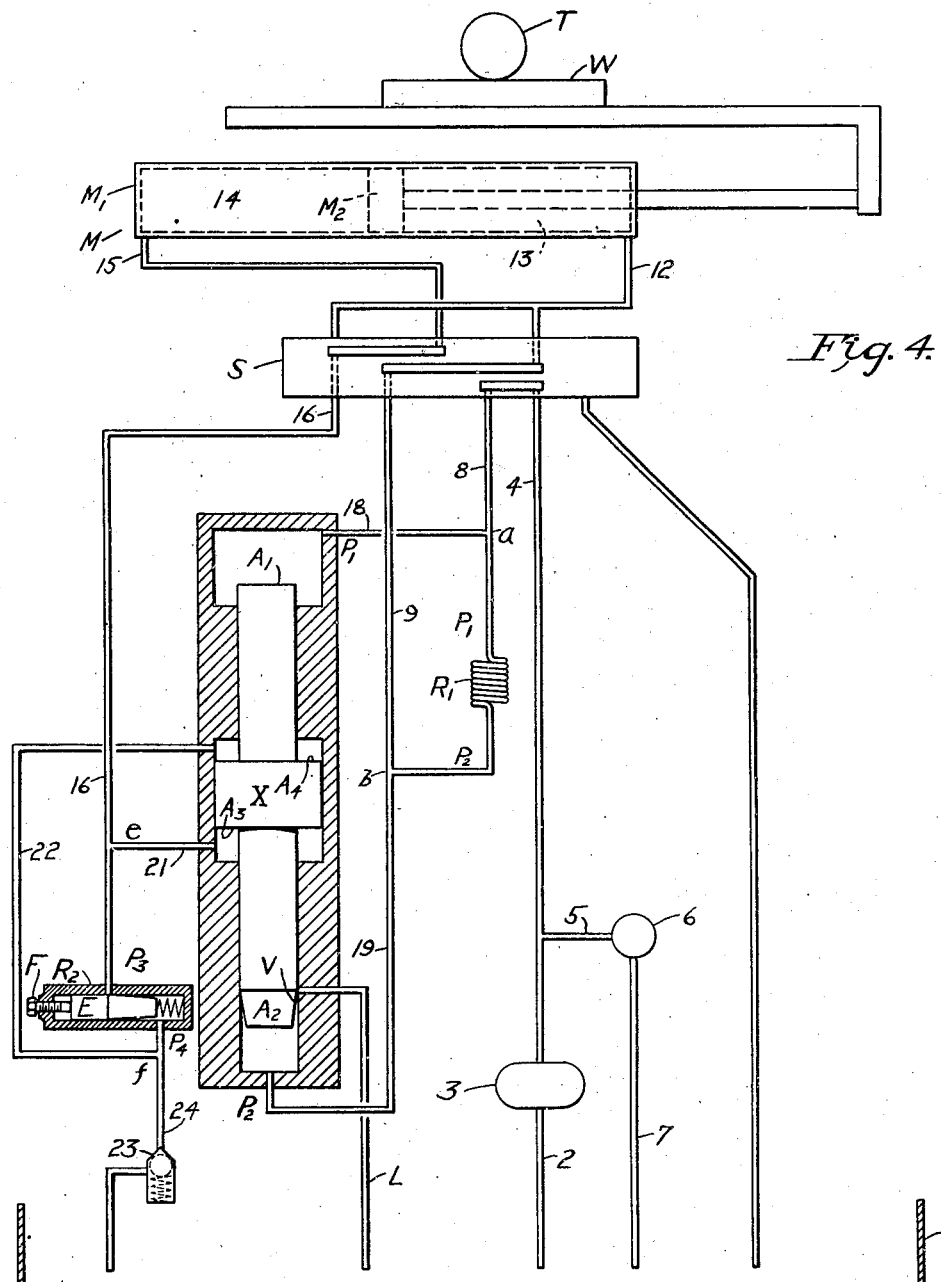
Figure 5:
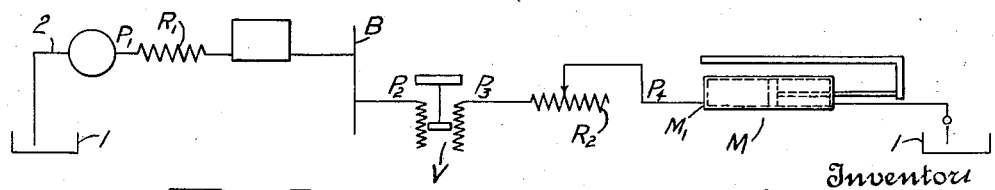

This throttle $R_2$ may be located either ahead of or behind the motor as shown by Fig. 3 and Fig. 4 respectively. Thus, in Fig. 3, it is in line 9 while in Fig. 4, it is in the outlet line 16. This throttle, in case but a single feed-rate is desired, need not, of course, be made adjustable, or if adjustable may be locked in its setting, but in practically all cases it is desired that the motor may be propelled at any one of a selective series of feed-rates and hence the throtttle will usually be manually adjusable as indicated on diagrams Figs. 3, 4, 8, etc., or automatically as diagrammed by Fig. 6.

On Fig. 3, from the points a and b (before and behind $R_1$) and the points d and c (before and behind $R_2$) run conduits 18, 19, 19$^a$ and 20, respectively, to corresponding chambers in the casing within which slides the member X presenting opposing areas $A_1$ $A_2$ and opposing areas $A_3$ $A_4$. The member X is thus subjected to the opposing forces $P_1A_1-P_2A_2$ and $P_3A_3-P_4A_4$. A tapered portion V, serving to reduce or restrict the available size of a side vent at v, constitutes a valve for regulating the drainage through the auxiliary pipe L. A like construction obtains as to Fig. 4 where conduits 21 and 22 carry the throttle differential from the points e and f to the compensator. In each instance, it will be noted that the viscosity differential is urging the valve in the direction of closure, and the throttle differential urges it oppositely, so that the valve will take a position of balance which determines the amount of drainage.

In each instance, area $A_1$ must be made to equal area $A_2$, and likewise $A_3 = A_4$, insofar as compensation for viscosity alone is concerned, to conform to the general relation prescribed by this invention; to wit, $$\frac{\text{Area subjected to throttle differential}}{\text{Area subjected to viscosity differential}} = \frac{\text{viscosity differential}}{\text{throttle differential}}$$

If the plunger areas $A_1$ and $A_2$ be represented each by $A_v$ and the annular areas $A_3$ $A_4$ by $A_t$, then $P_1A_1 - P_2A_2$ assumes the form $A_v(P_1-P_2)$ and likewise $P_3A_3 - P_4A_4$ assumes the form $A_t(P_3-P_4)$ and the condition of equilibrium becomes $$A_v(P_1-P_2) = A_t(P_3-P_4)$$

and $$\frac{A_t}{A_v} = \frac{P_1-P_2}{P_3-P_4}$$

In the special case of Fig. 3, where $P_2$ and $P_3$ are equal, there is no structural need of using separate chambers for these pressures, and it suffices to use a single chamber by making the end of the plunger equal in area to $A_2$ plus $A_3$; as shown in full lines. In the special case of Fig. 4, it is to be noted that $P_4$ is fixed by the magnitude of the relief valve 23 which, if omitted or given merely a nominal value, enables line 22 to be omitted.

Through the foregoing it has been explained in detail how this invention is applicable to systems where the immediate source of oil is derived under a constant volume; to wit, by directly regulating an auxiliary drainage, to regulate the flow of the utilized residue of the main flow. This clears the way for explaining how it also renders possible a compensation for viscosity and temperature changes in systems where the immediate source of oil is derived under a constant (or even varying) pressure, as from an accumulator with or without any drainage to waste.

To do this, it is prescribed that, as before, a means of measuring the viscosity shall be embodied in the system from which may be taken the viscosity differential. A small auxiliary constant-displacement pump on a local circuit may be introduced, but inasmuch as so-called accumulator systems are usually supplied by an ample constant-displacement pump, the needful viscosity differential may be obtained from a fixed resistance arranged to carry the full output of that pump.

In such cases, the accumulator may be regarded as receiving the auxiliary drainage from the pump where its full output is not being required by the motor, or if the accumulator be full, the safety relief valve may by-pass the un-used fraction. So also, if the motor be operating for a short time at a rate demanding more than the full output of the pump, then will the deficiency be made up by the accumulator and this fraction may be regarded as a negative drainage or make-up.

Whether positive or negative, if the total supply be derived only from a constant-displacement pump, or its accumulator, and if the un-used fraction be held volumetrically constant for each selected rate of motor propulsion, then will the fraction of oil used for motor actuation flow also at a volumetrically constant rate. Of conversely, if the latter fraction be held uniform, then must the other also be constant as a result of indirect regulation. And this principle lends itself readily to compensation for viscosity in accumulator systems, as will now be developed.

Referring to Figs. 5 to 10 inclusive, it will be noted that the fraction of oil passing through the compensator is used for motor actuation instead of being drained as in Figs. 1 to 4 inclusive. Looking at the problem from another angle, the present embodiments locate the motor in the line corresponding to L of Fig. 3 and the fluid going through the line 11 is sent to storage in an accumulator CP instead of to the motor; the respective systems being, generally speaking, the converse of one another. It may promote a more thorough understanding of this invention to note, at this point, that in the system of Fig. 3, an extra motor might be included in the drain line L and that it would be compensated for viscosity, but, of course, its rate would not be that of the main motor if the throttle location is unchanged. If the rate of flow to the main motor be S and of the flow to the auxiliary motor be S' then S' = (T − S) where T = rate of total flow.

Figure 6:
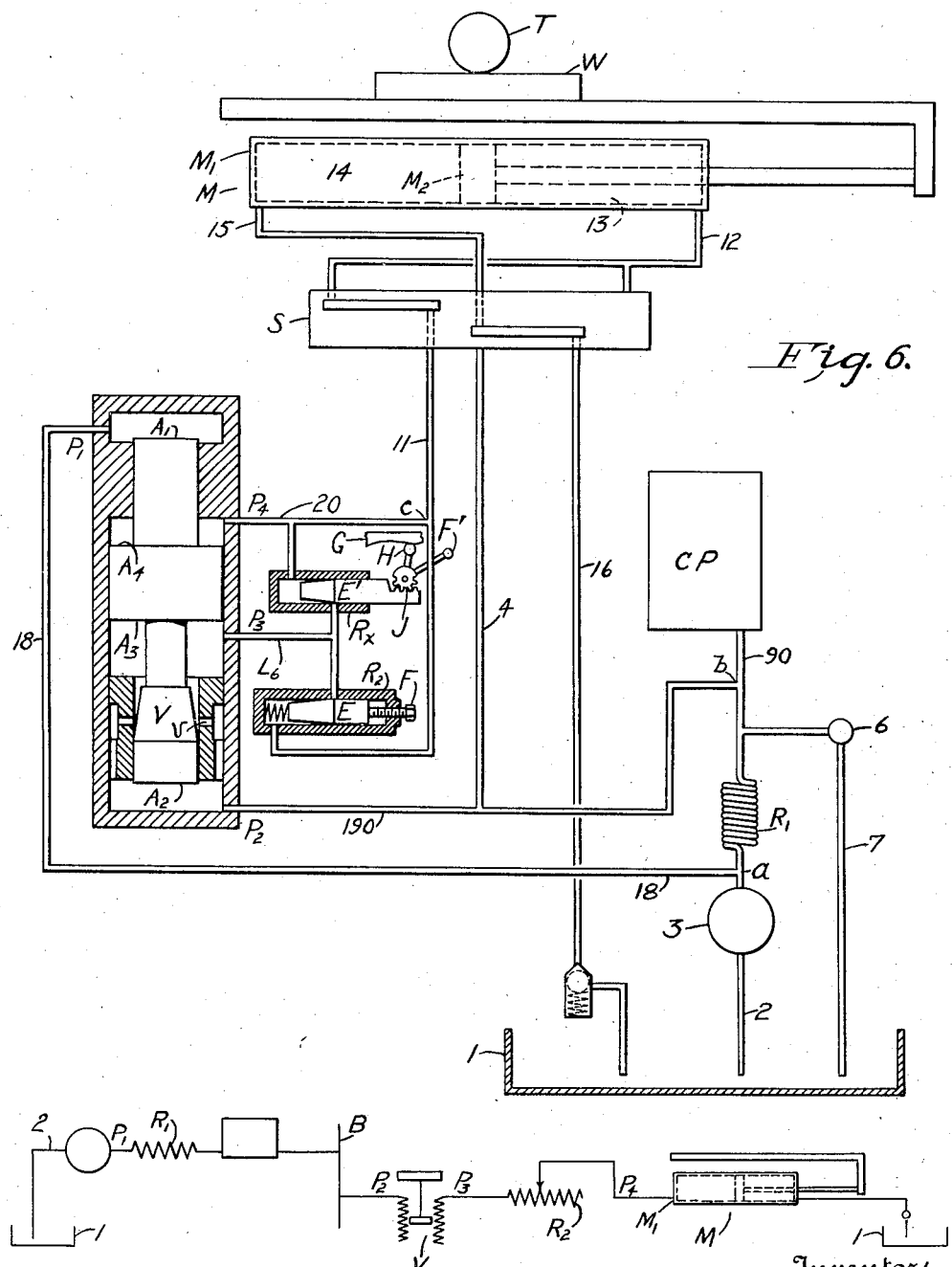
Figure 7:
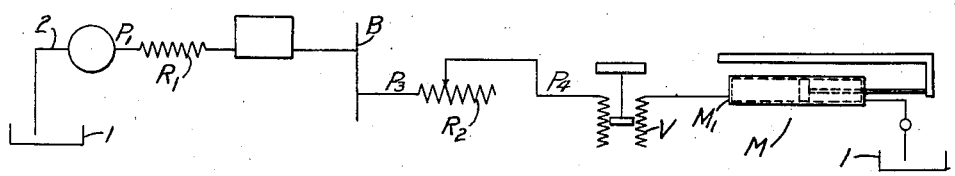

In Figs. 5 and 6, characters similar to those used in Figs. 1 to 4, have been employed for substantially equivalent elements to facilitate ease of comparison and avoid repetition of description. The volumetrically constant flow from the source 3, after first passing through the resistance coil $R_1$, divides at b; the fraction entering the line 190 being directly maintained at a volumetrically constant rate by the compensator, and the fraction entering the line 90 and supplying the accumulator CP being indirectly held at a volumetrically constant rate. The latter fact, however, is an incident rather than a necessity to the operation of this species in which the accumulator may be regarded as a source of fluid under approximately constant pressure. But it well illustrates the applicability of the general method of effecting compensation for viscosity and temperature variations. The point to be observed is that some means of ensuring a volumetrically constant flow through a fixed resistance must be provided and, in this instance, advantage is taken of the fact that it is convenient to use a constant-displacement pump to maintain a fluid supply under pressure in a reservoir such as an hydraulic accumulator of any well-known construction. This resistance $R_1$, therefore, renders available the viscosity differential which is applied to a differential valve, as previously explained; in this instance through the conduits 18 and also the conduit 190 which at the same time carries the fluid used to propel the motor M. By referring to the linear diagrams (Figs. 5, 7 and 9) it will be seen that the serial order of the elements between the accumulator and the final reservoir may be varied; thus either in the order V, $R_2$, M, or $R_2$, V, M, or M, $R_2$, V, or M, V, $R_2$. Generally speaking, however, it is preferable to locate the throttle $R_2$ ahead of the compensator to keep the throttle unaffected by any local alteration in viscosity due to the dissipation of energy by the resistance introduced by the compensator.

The flow, in Fig. 6, after passing the differential valve enters the line L₄ and meets the throttle. In this instance, there are shown two interchangeably available throttles, the one R₂ being a hand-throttle which is used when it is desired to set the motor rate at will, and the other Rₓ being a power-operated throttle for use where it is desirable to have the machine itself set the throttle. The latter is sometimes desirable, in a milling machine for example, when tooling a work-piece of variable dimensions. Such machines are provided with dog and trip mechanisms which can be mechanically connected with the throttle to shift it at different points in the cycle of the machine.

As illustrated in Fig. 6, one form of power means for adjusting the throttle Rₓ comprises a dog or cam G, carried preferably by the shiftable element of the machine, which actuates a plunger or lever H in such manner as to shift the valve stem E¹ thereby to vary the rate automatically. An auxiliary lever F¹ is also provided and which, through the connection J, serves as a medium for shifting the valve stem manually.

Figure 8:
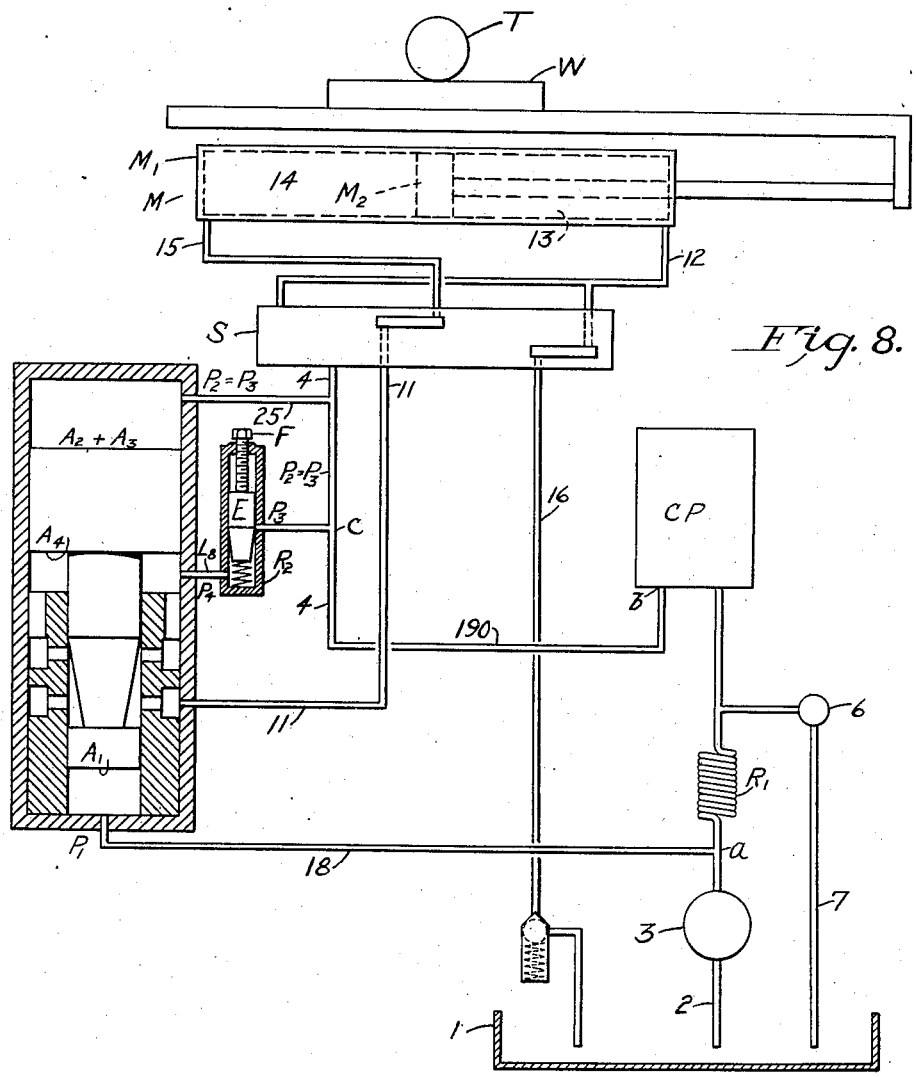

In Figs. 7 and 8, it will be observed that the conduit 190 leads directly from the accumulator and draws oil therefrom as rapidly or as slowly as the motor is throttled to run. Also that the pump, except when by-passing through the relief valve 6, is adding fluid at a volumetrically constant rate to the accumulator. The conditions here are in reality identical with those of Figs. 5 and 6, but Fig. 8 perhaps better illustrates the principle that the potential, and not the rate of flow through the line 190, corresponds to the value of P₂ and therefore the branch line 25 is under the pressure at the discharge end of the fixed resistance because the latter is always subject to whatever pressure exists in the accumulator.

So also, in this specific arrangement, that same pressure exists at the inlet of the throttle and P₂ equals P₃ and hence a single area equal to the sum of A₂ and A₃ will serve; giving a simplified compensator as explained in connection with Fig. 3;

Figs. 9 and 10 represent a motor-discharge control system with automatic compensation, as in the preceding modifications, for changes in viscosity and changes in work resistance. The rapid traverse, in this case, requires an independent discharge line 16ª; the regular discharge line 16 from the four-position reverse, selector and stop valve S being under the regulation of the throttle and compensator. As illustrated, the throttle precedes in order the compensator, but the order may be reversed. The viscosity differential is carried to the compensator by lines 18 and 19 and the throttle differential by lines 21 and 22.

Fig. 11 exemplifies the application of this invention to a machine or organization whereby a plurality of motors admit of independent operation; each at the rate determined by its own throttle. Although a single pump is used, the rate of any one motor may be re-set, and its load may vary, without disturbing the action of any other motor. While the arrangement illustrated by Fig. 11 is a plural embodiment of Fig. 8 (preferred by reason of its simpler valve) it is to be understood, as indicated by the common main B of Figs. 5, 7 and 9, that each likewise admits of the employment of a plurality of motors. That main is fed by the common supply, a pump or accumulator through lines 31 and 190, and from it lead the several conduits L which conduct the fluid under pressure to the motors under the control of their throttles and compensators. To the latter are carried the two pressures determined by a constant flow through a fixed resistance (the viscosity differential) and, as a matter of convenience, but not of necessity, a single fixed resistance may serve for all; as for example R₁ through line 18 and common line 27 and branch lines 28, 28. In the example illustrated, 3 is a constant displacement pump and its main line to the several operating sub-systems suffices to transmit also the pressures P₂ and P₃ (they are here equal) to the compensator.

Sometimes, as has been previously mentioned, the hydraulically actuated machine-tool may, to meet the particular needs of the user, require but little or much oil for the motor. In the interest of economy, the output of the pump should not be more than sufficient to meet the maximum requirements of the motor. Of course, the manufacturer of the machine-tool could install a corresponding size of constant-displacement pump, but for occasional departures from standard machines, it is less expensive to install a variable-displacement, even though itself more costly, and adjust or set it initially to yield the out-put needed.

How this can be done can be learned by referring to diagram Fig. 12 in which VD represents a variable-displacement pump adapted, by a shift of its adjusting member 40, to be set to yield any desired constant-displacement out-put. This flow is carried by line 190 to the resistance Ra. Now, to make this the same value in all cases, would involve revised proportions in the motor control elements, and to avoid that trouble, it is preferable to meet the adjustment of the pump by an adjustment of the "fixed" resistance so as to keep the viscosity differential the same.

The system last-mentioned requires a more or less expert setting of the value of the "fixed" resistance. The ultimate user can hardly be expected to make that adjustment skillfully, and it should best be done at the factory before shipping the machine-tool or by sending a competent adjuster to the user's plant.

Where the user is likely to require frequent re-settings of the pump rate, it is desirable to embody in the machine a mechanical linkage, or the like, between the lever 40' for adjusting the pump and the means for setting the resistance Ra to its corresponding value. This arrangement is illustrated diagrammatically by Fig. 13.

In certain other cases, it is desirable that the rate of the pump shall be such as to maintain a constant-pressure on the motor-operating line or lines regardless of the number of motors into or out of operation and/or regardless of their rates of propulsion. To meet that condition, an arrangement such as proposed by Fig. 14 may be resorted to. Here, a spring-opposed piston 44 is shifted within the cylinder 43 to balance by the hydraulic pressure in the main line beyond the settable resistance Ra. The movement of that piston is, by a suitable linkage 42, used automatically to adjust the rate of the pump and simultaneously the value of the fixed resistance Ra.

It is to be understood, that in each of these three modifications, the fixed resistance is used to measure the viscosity and the pressure-differential is applied, as previously explained, in a compensator to meet the variations in viscosity due either to a replacement of new oil of different viscosity or to temperature changes.

It will be seen from the foregoing that this invention renders available, through numerous adaptations, a relatively simple way of compensating for variations in viscosity, either alone, or at the same time for changes in work-resistance; making it possible to have in the machine a throttle which, for each setting thereof, will ensure a definite rate of propulsion of the motor. Sometimes the motor may be used to control the travel of the table when there exists a negative work-resistance, as in taking a downward cut in a milling machine. To meet this condition, preference will be given to one or another of the so-called closed circuit systems and especially to one of the species shown with the compensator and throttle in the out-let line from the motor.

Having thus revealed this invention, we claim as new and desire to secure the following combinations and elements, or equivalents thereof, by Letters Patent of United States:—

1. An hydraulic system combining a motor; a constant-displacement pump; a conduit therebetween; a throttle in said conduit; an out-let valve located in said conduit between the pump and throttle; and means for automatically regulating said valve to maintain a volumetrically-constant discharge therethrough at a rate determined by the adjustment of said throttle.

2. An hydraulic system combining a fixed resistance; means for causing fluid to flow at a volumetrically constant rate past said fixed resistance; a motor; a second resistance in serial relation with said motor for determining the rate of propulsion of said motor; a differential plunger and an escapement-valve operated thereby; and conduits for subjecting opposing areas of said plunger to the hydraulic pressures across said fixed resistance, and other opposing areas of said plunger to pressures across said second resistance, whereby the escapement permitted by said valve will be maintained at volumetrically constant rate.

3. An hydraulic system combining; an hydraulically propelled motor; a throttle in serial relation with said motor for determining the rate of propulsion of said motor; a fixed resistance; means for causing fluid to flow at a volumetrically-constant rate past said fixed resistance; a differential plunger and a valve operated automatically thereby, said valve being in parallel relation with said motor; and conduits for subjecting opposing areas of said plunger to the hydraulic pressures across said fixed resistance, and other opposing areas of said plunger to pressures across said throttle, whereby the flow permitted by said valve and throttle will be maintained at volumetrically-constant rate.

4. An hydraulic system combining a source of fluid under pressure; a conduit supplied thereby; a motor propelled by fluid in accordance with its rate of flow through said conduit; and means for permitting said flow to occur only at a selected volumetrically constant rate, regardless of variations in work-resistance and viscosity; said means comprising in serial relation a hand-throttle and a differential valve; a fixed resistance; means for causing fluid at a volumetrically-constant rate to flow therethrough; and pressure lines for subjecting the differential valve to the drop in pressure across said hand-throttle and fixed-resistance, respectively in opposition.

5. An hydraulic system combining a reservoir, a pump adapted continuously to draw oil therefrom at a volumetrically-constant rate against variable back-pressures; a resistance fixed with reference to the rate of delivery of said pump and arranged to carry the full output of said pump; an oil utilizing line including a motor; a throttle in said line for limiting the amount utilized for actuating said motor; an oil-diverting line for the un-used fraction, said line being under pressure at its take-off; a differential plunger having two sets of opposed areas; pressure transmitting lines for subjecting said areas to the pressures before and behind the fixed resistance and the throttle respectively; and a valve positioned by the position of said plunger when in equilibrium, said valve being arranged to vary the proportion of oil distributed to the oil-utilizing and oil-diverting lines to compensate for variations in viscosity regardless of variations in the duty of the motor.

6. In an hydraulic system including a source of oil supply and fluid conduits; a differential valve in one of the conduits of said system and operative to control the flow of fluid therethrough; means responsive to changes in viscosity of the fluid in said system for acting on said valve; a throttle in one of the conduits of said system for controlling the flow of fluid therethrough; and means responsive to the drop in pressure across said throttle for acting upon said valve in opposition to said first mentioned means.

7. An hydraulic system combining a source of oil; an hydraulic motor adapted to be propelled by oil derived from said source; valve-means for determining the rate of flow through said motor; a hand-grasp for manually giving said valve-means primary adjustments; and an instrumentality sensitive to viscosity changes for varying the effectiveness of said valve-means, said instrumentality being responsive to and maintained in equilibrium by pressure variations caused by by changes in the work-resistance encountered by said motor.

8. In a hydraulic system for propelling a motor at a selective constant-rate; the combination of a primary manual control and an automatic secondary control, said secondary control being responsive to variations in viscosity and conversely responsive to variations in the drop in pressure caused by said manual control.

9. An hydraulic system combining a reservoir, a pump adapted continuously to draw oil therefrom at a volumetrically-constant rate against variable back-pressures; a resistance fixed with reference to the rate of delivery of said pump and arranged to carry the full output of said pump; an oil-utilizing main-line including a motor; a throttle in the main line for limiting the amount utilized for actuating said motor; an oil-diverting line for the unused fraction, said line being under pressure at its take-off; a differential plunger having two sets of opposed areas; pressure transmitting lines for subjecting said areas to the pressures before and behind the fixed resistance and the throttle respectively; and a valve located in the main line and held in adjusted position by the plunger when in equilibrium, said valve being directly arranged to vary the proportion of oil distributed to the oil-utilizing line and indirectly to oil-diverting line to compensate for variations in viscosity regardless of variations in the duty of the motor.

10. An hydraulic system combining; a constant-displacement pump; a reservoir; a conduit therebetween; a motor and a throttle in said conduit; an accumulator connecting with said conduit between the pump and motor; a valve located in said conduit; and means for automatically regulating said valve to maintain a volumetrically-constant discharge therethrough at a rate determined by the adjustment of said throttle.

11. An hydraulic system combining a fixed resistance; means for causing fluid to flow at a volumetrically-constant rate past said fixed resistance; a motor; a second resistance in serial relation with said motor for determining the rate of propulsion of said motor; a differential plunger; and conduits for subjecting opposing areas of said plunger to the hydraulic pressures across said fixed resistance, and other opposing areas of said plunger to pressures across said second resistance; an escapement valve in serial relation with said motor and operated by said plunger whereby the escapement permitted by said valve will be maintained at volumetrically-constant rate.

12. An hydraulic system combining a reservoir, a pump adapted continuously to draw oil therefrom at a volumetrically-constant rate against variable back-pressures; a resistance fixed with reference to the rate of delivery of said pump and arranged to carry the full output of said pump; an oil utilizing line including a motor; a throttle in said line for limiting the amount utilized for actuating said motor; an oil-diverting line for the unused fraction, said line being under pressure at its take-off; a differential plunger having two sets of opposed areas; pressure transmitting lines for subjecting said areas to the pressures before and behind the fixed resistance and the throttle respectively; and a valve located in the oil-diverting line and held in adjustment by the position of said plunger when in equilibrium, said valve being arranged to vary the proportion of oil distributed to the oil-utilizing and oil-diverting lines to compensate for variations in viscosity regardless of variations in the duty of the motor.

13. An hydraulic system combining; an hydraulically propelled motor; a throttle in serial relation with said motor for determining the rate of propulsion of said motor; a fixed resistance; means for causing fluid to flow at a volumetrically-constant rate past said fixed resistance; a differential plunger and a valve operated automatically thereby; and conduits for subjecting opposing areas of said plunger to the hydraulic pressures across said fixed resistance, and other opposing areas of said plunger to pressures across said throttle whereby the flow permitted by said throttle will be maintained at volumetrically-constant rate.

14. An hydraulic system combining a fixed resistance; means for causing fluid to flow at a volumetrically-constant rate past said fixed resistance; a motor; a second resistance in serial relation with said motor for determining the rate of propulsion of said motor; a differential plunger and an escapement-valve operated thereby; and conduits for subjecting opposing areas of said plunger to the hydraulic pressures across said fixed resistance, and other opposing areas of said plunger to pressures across said second resistance, whereby the flow through said second resistance will be maintained at a volumetrically-constant rate.

15. An hydraulic system combining a fixed resistance; means for causing fluid to flow at a volumetrically-constant rate past said fixed resistance; a motor; a second resistance in serial relation with said motor for determining the rate of propulsion of said motor; a differential plunger and an escapement-valve operated thereby; and conduits for subjecting opposing areas of said plunger to the hydraulic pressures across said fixed resistance, and other opposing areas of said plunger to pressures across said second resistance, whereby the escapement permitted by said valve will insure a volumetrically-constant flow through said second resistance.

HANS ERNST.
CHARLES W. McK. GOODRICH.